United States Patent
Luck et al.

(10) Patent No.: US 11,847,509 B2
(45) Date of Patent: *Dec. 19, 2023

(54) INFRASTRUCTURE BASE MODEL API

(71) Applicant: salesforce.com, inc., San Francisco, CA (US)

(72) Inventors: Leandro Luck, Buenos Aires (AR); Agustin Lopez Gabeiras, Buenos Aires (AR); Gaston Alberto Lodieu, Buenos Aires (AR); Diego Gabriel Larralde, Buenos Aires (AR); Alvaro Gaita, Buenos Aires (AR); Maximiliano Akike, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/198,460

(22) Filed: Mar. 11, 2021

(65) Prior Publication Data

US 2021/0200605 A1 Jul. 1, 2021

Related U.S. Application Data

(63) Continuation of application No. 16/375,331, filed on Apr. 4, 2019, now Pat. No. 10,970,135.

(51) Int. Cl.
*G06F 7/06* (2006.01)
*G06F 9/54* (2006.01)
(Continued)

(52) U.S. Cl.
CPC ............ *G06F 9/541* (2013.01); *G06F 16/908* (2019.01); *G06F 16/9024* (2019.01)

(58) Field of Classification Search
CPC .... G06F 9/541; G06F 16/9024; G06F 16/908; G06F 8/35
See application file for complete search history.

(56) References Cited

U.S. PATENT DOCUMENTS 6,615,199 B1 * 9/2003 Bowman-Amuah ... G06F 9/449
706/50
2008/0300851 A1 * 12/2008 Chakrabarti ............ G06F 8/433
703/22
(Continued)

OTHER PUBLICATIONS

Matej Artac et al., "Infrastructure-as-Code for Data-Intensive Architectures: A Model-Driven Development Approach", (Year: 2018).
(Continued)

*Primary Examiner* — Kevin L Young
*Assistant Examiner* — Abdou K Seye
(74) *Attorney, Agent, or Firm* — Sterne, Kessler, Goldstein & Fox P.L.L.C.

(57) ABSTRACT

Embodiments of apparatus, systems, and methods are described for creating and managing an abstract, API-based infrastructure base model. The API-based model can abstract infrastructure assets, such as infrastructure components or connections between components, into a metadata model using standardized syntax and interfaces, for defining and building an infrastructure. Using a modeling document, connections and components of an infrastructure can be abstracted into an API-based model having semantics that covers them all. Connections and infrastructure components can be made available for selection, arrangement, and grouping to build complex infrastructure models without requiring complex API coding by the user. Other infrastructure models having different API definitions can be by abstracted to standardize the assets for building new APIs. The APIs can be further modified and exported to another or the same implementation project.

20 Claims, 7 Drawing Sheets

(51) Int. Cl.
*G06F 16/901* (2019.01)
*G06F 16/908* (2019.01)

(56) References Cited

U.S. PATENT DOCUMENTS

| | | | | |
|---|---|---|---|---|
| 2012/0166646 | A1* | 6/2012 | Boldyrev | G06F 9/5088 |
| | | | | 709/226 |
| 2013/0191187 | A1* | 7/2013 | Ludwig | G06Q 10/06375 |
| | | | | 705/7.39 |
| 2017/0026416 | A1* | 1/2017 | Carpenter | G06F 16/9024 |
| 2018/0307780 | A1* | 10/2018 | Keenan | G06F 3/0485 |
| 2019/0079751 | A1 | 3/2019 | Foskett et al. | |
| 2020/0059420 | A1 | 2/2020 | Abraham | |
| 2020/0278920 | A1 | 9/2020 | Khakare et al. | |
| 2020/0319942 | A1 | 10/2020 | Luck et al. | |

OTHER PUBLICATIONS

Julio Sandobalin et al., "An Infrastructure Modelling Tool for Cloud Provisioning" (Year: 2017).

\* cited by examiner

INFRASTRUCTURE BASE MODEL API

CROSS REFERENCE TO RELATED APPLICATIONS

This application is continuation of U.S. application Ser. No. 16/375,331 by Luck, et al., titled "Infrastructure Base Model API," filed Apr. 4, 2019, which is incorporated by reference herein in its entirety.

BACKGROUND

The technical field relates to the design, development, and build of, and modification to, an infrastructure base model to provide a foundation for an information technology (IT) system or subsystem, such as a private cloud, a security group, or a specific service, for example, using expanded Infrastructure as Code (IaC) technology. IaC is the process of managing and provisioning computer data centers (CDCs) for an IT system using machine-readable definition files, rather than using physical hardware configuration or interactive configuration tools.

Many and various options exist in the art to define infrastructure as code (IaC) solutions. Each IaC solution may use different and unique coding syntax and interface features, for example. These options use plugin-based infrastructure base models that require an infrastructure's assets (services, etc.) to expose their own application programming interfaces (APIs), with the unique syntax and interfaces of the plugin-based models. Using one of such plugin-based models to develop an infrastructure base model for a CDC, a developer would need to first learn the new syntax, then translate the original code, and finally validate the code before running it on a machine of the CDC. A developer may then find that some features are only supported in the original IaC solution and may then have to make custom code changes for compatibility. This process can be inefficient, inconsistent, and error-prone for a developer, potentially costing unnecessary time and money to build and implement an infrastructure project.

IaC abstraction can further infrastructure modernization to improve the efficiency of managing and provisioning CDCs. An improved IaC solution is needed for developing an infrastructure base model using abstract definitions of infrastructure assets and individual IaC instances. Further, methods of interfacing to the abstractions of the infrastructure base model are needed to aid in the efficiency for a developer in applying the abstractions to individual CDC projects.

BRIEF DESCRIPTION OF THE DRAWINGS

The accompanying drawings, which are incorporated herein and form part of the specification, illustrate the present embodiments and, together with the description, further serve to explain the principles of the present embodiments and to enable a person skilled in the relevant art(s) to make and use the present embodiments.

Figure 1:
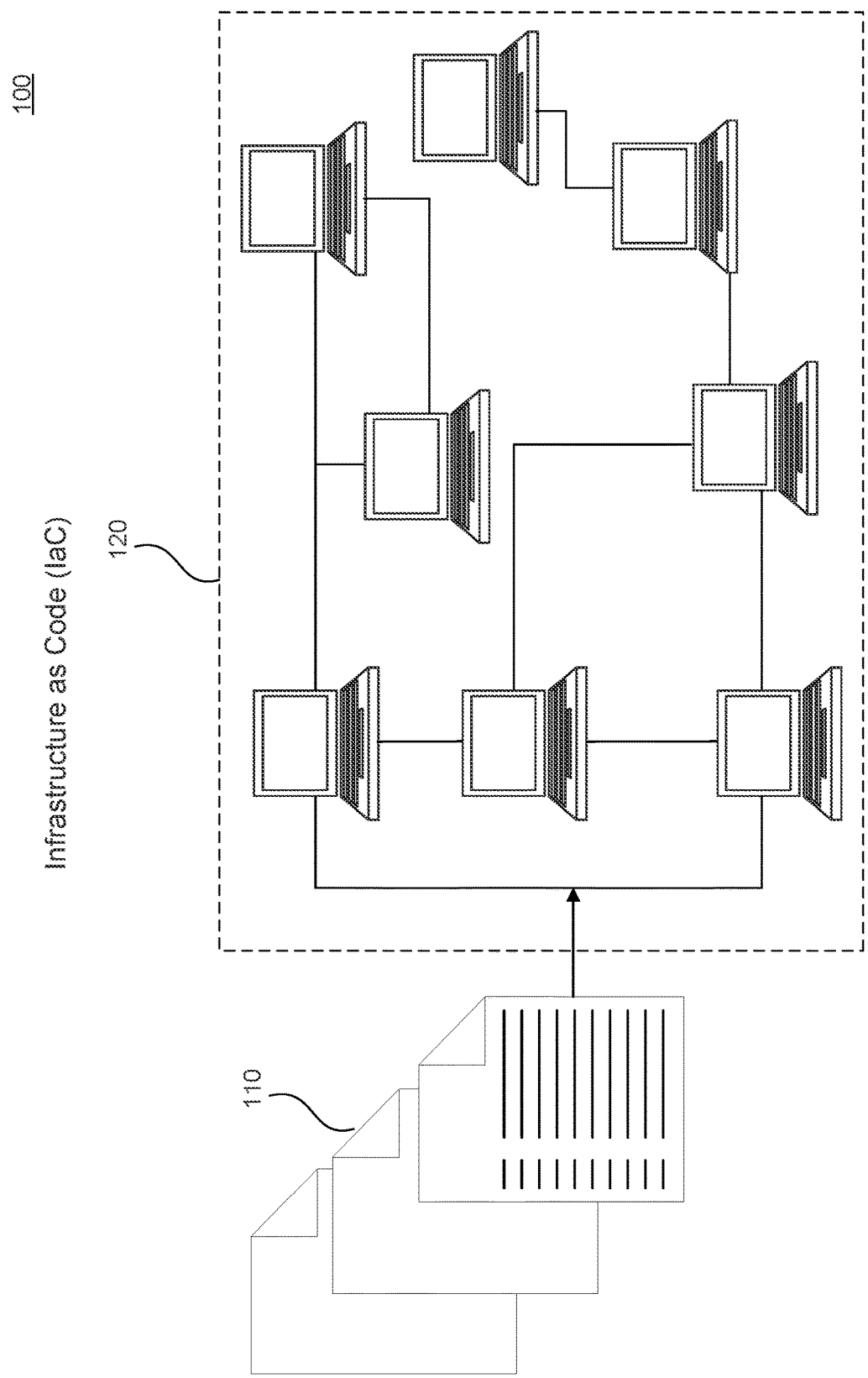
FIG. 1 illustrates a diagram of Infrastructure as Code (IaC) definition files being used to create and manage a computer data center (CDC), according to one example.

The features and advantages of the present embodiments will become more apparent from the Detailed Description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

This disclosure describes methods and user interfaces for creating and managing an abstract, API-based infrastructure base model having more integration flexibility, allowing more user control over the design of the infrastructure, and containing more functionalities than a dedicated, plugin-based infrastructure base model. The API-based model can abstract all potential infrastructure assets, such as infrastructure components or connections between components, into a metadata model (or, dialect) for defining and building an infrastructure. And in doing so, the model does not have to rely on the syntax and interface particulars (for example, of a dedicated API) of each potential infrastructure asset to integrate the assets together.

An infrastructure can be defined by dedicated code. FIG. 1 illustrates a diagram 100 of Infrastructure as Code (IaC) definition files 110 being used to create and manage a computer data center (CDC) 120 of an infrastructure, according to one example. The IaC definition files 110 are machine-readable definition files that take the place of physical hardware configuration or interactive configuration tools for provisioning a CDC, for example.

Figure 2:
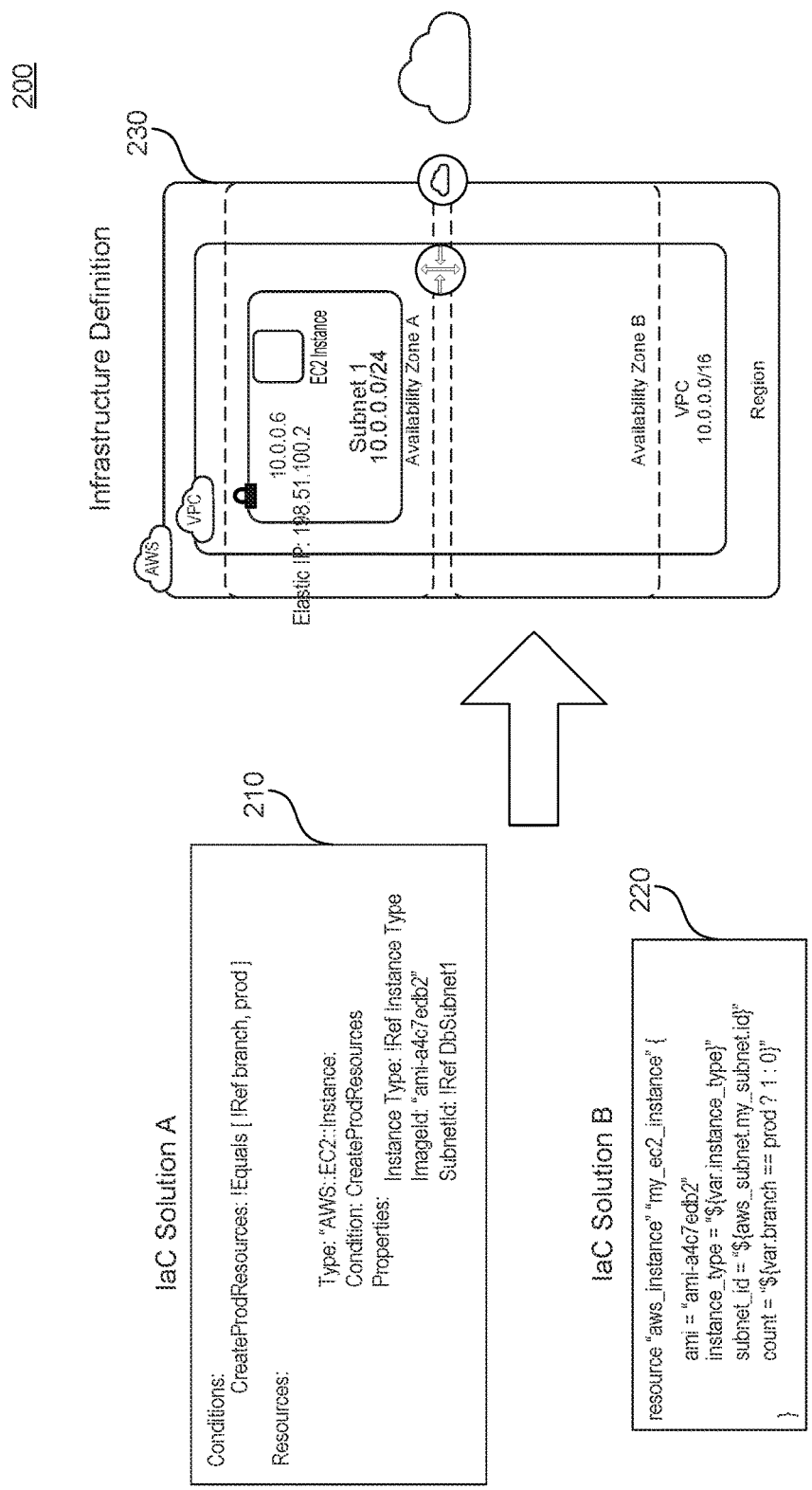
FIG. 2 illustrates a diagram showing a unique IaC solution A and a unique, but different IaC solution B that define the same infrastructure definition, according to one example.

Different IaC definition files, for example, of different vendors, may define the same infrastructure, but with different syntax and coding requirements. FIG. 2 illustrates a diagram 200 showing a unique IaC solution A 210 and a unique, but different IaC solution B 220 that define the same infrastructure definition 230, according to one example. Each IaC solution 210, 220 is produced by unique vendor code that may be incompatible. Thus, the development environment in which an original IaC solution was created would be needed to modify infrastructure definition 230 for subsequent changes to a CDC of the infrastructure, for example. Specifically, if infrastructure definition 230 was created in the development environment using IaC solution A 210 to create infrastructure code, any changes to be made to infrastructure definition 230 later would require the development environment of IaC solution A 210 to make those changes to the infrastructure code. This infrastructure code would be known as a "plugin" because of its dedicated code for interfacing to the CDC components of the infrastructure.

To migrate from the dedicated IaC solution A 210 to the dedicated IaC solution B 220, a developer who may have coded IaC solution A 210 would first need to learn the syntax of IaC solution B 220, with which the developer would then need to translate the IaC solution A 210 code to the IaC solution B 220 code. Because of potential incompatibilities of the different code syntaxes, because some features of IaC solution A 210 may not be supported by IaC solution B 220, and for a myriad of other reasons, the new code would need to be validated and likely debugged before running it from the IaC solution B 220 environment on the CDC of the infrastructure, causing inefficiencies and expense.

As would be understood by a person of ordinary skill in the art, if an IaC solution could be abstracted to remove the aforementioned incompatibilities, inefficiencies of such a migration of the IaC solution could be minimized or eliminated, and the IaC solution could be applied generically and flexibly to various infrastructures. This disclosure is based on the concept that underneath every IaC solution can be an abstract definition of the infrastructure that a developer aims to build. Additionally, an infrastructure can be described with a modeling language to build an abstract infrastructure base model to represent a given IaC solution.

A modeling language such as the open-source Anything Modeling Language (AML), for example, can use the vocabulary of different infrastructure publications (for example, of third parties, such as competitors) to build an infrastructure base model. By way of example, AML is a declarative language for defining metadata documents that can be parsed into graphs of information. These documents can be published and linked on the web or through any other type of API. AML, for example, can be used to describe common, existing YAML (or, YAML Ain't Markup Language), JSON (or, JavaScript Object Notation), or other such metadata documents, for example, or to define the semantics and structure of completely new metadata formats, with variations as would be understood by a person of ordinary skill in the art.

AML metadata documents, for example, can use well-defined, formal semantics that can be reused across multiple types of metadata to define infrastructure resources. AML metadata documents can also use explicit schema that can be used to automate parsing and validation. AML can provide support for hyperlinks as a mechanism to connect and publish metadata documents. By way of example, AML offers out-of-the-box modularity, allowing a metadata graph to be split into composable sets of documents. Further, an AML document can be directly translated into a graph of data that can be stored, queried, and published. Other metadata document formats can offer similar benefits and features, as would be understood by a person of ordinary skill in the art.

Using such a metadata document, connections and components of an infrastructure (defined generally as "resources," or "assets") can be abstracted into an API-based model having semantics that covers them all, such that the user (for example, a developer) does not need a great amount of technical knowledge about the backend structure of the connections or components. Various connections (for example, interfaces, contracts, policies, etc.) and infrastructure components can be abstracted, standardized, and made available for selection, arrangement, and grouping to build complex infrastructure models without requiring complex API coding by the user.

An abstract infrastructure base model API can include and configure the entire infrastructure for an IT system in a company, for example, such as load balancers, security groups, various machines, and other connectivity elements, for the deployment and integration of applications (apps) within an application network in a short amount of time and with minimum effort. Apps can be deployed automatically with application-specific implementation parameters, such as for telecom, cloud formation, and web services, for example. The totality of these APIs, implementation parameters, and connectivity elements, generally called assets, can describe the infrastructure model.

A typical infrastructure with these core assets would not typically use a consistent connectivity contract between each asset, however. For example, there may be different authentication, data formats, and protocols for applications that run on-premises or in the cloud. By using system APIs to abstract the backend systems, orchestration of all of these infrastructure pieces can be done without having to transform data or implement point-to-point integrations, for example. These system APIs can implement consistent, transparent contracts for connectivity across an entire network, thus simplifying integration, to provide a platform for business-as-a-service with higher speed, more agility, and more innovation while adhering to individual rules and regulations of each type of connection. As a practical matter, the APIs are reusable assets that can be leveraged at all phases of the lifecycle. Additionally, the APIs can be leveraged easily by someone without a great deal of coding experience and without having to use a third party tool to write or edit the APIs.

One such system API, an infrastructure base model API, can make available pre-defined infrastructure patterns for new implementation projects, which can be used to configure machines automatically and perform validations, searches, and parameter changes using calls to metadata. Other APIs, such as those of a third party or competitor, can be imported, and their connections, components, and other assets can be further abstracted into the infrastructure base model API. This technology also affords the creation and integration of rich APIs with transparent contracts. These APIs can standardize an interaction model, provide easy access to data, provide flexibility, and accelerate time to market. This idea can be extended to the standardization of whole infrastructures, such that one platform can be used to model, create, update, and migrate infrastructure projects. Abstracted assets can be translated, modified, and exported to another or the same implementation project, for example.

Figure 3:
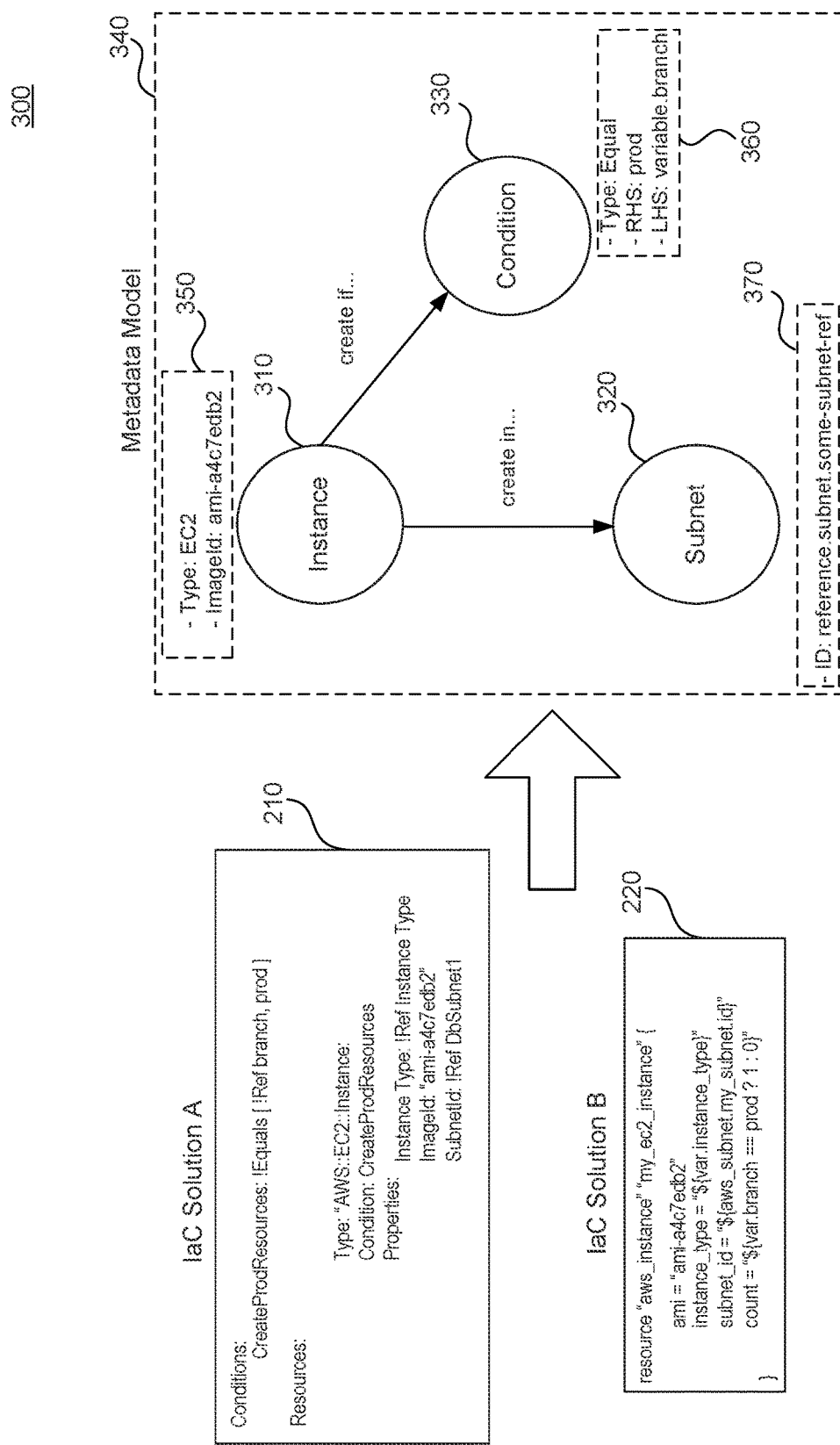
FIG. 3 illustrates a diagram of an example extraction of a metadata model (or, dialect) from two different IaC solutions that describe the same infrastructure, according to some embodiments.

FIG. 3 illustrates a diagram 300 of an example extraction of a metadata model (or, dialect) 340 from two different IaC solutions 210, 220 that describe the same infrastructure, according to some embodiments. The metadata model 340 includes definitions and build details for an example infrastructure. Based on each IaC solution 210, 220, each of which may be a unique API, and each of which may include a different definition file of the same infrastructure, a graph of information can be created to represent the aggregate infrastructure definition by parsing and combining the definition files into specific semantics. Each infrastructure resource can have its own unique semantics. By overlaying the semantics in the graph of information, the metadata model 340, capable of being customized into instances with specific semantics, can be created. In this example, the metadata model 340 includes model components such as instance 310 to be created in subnet 320 if condition 330 occurs. The metadata model 340 can also include applicable parameters 350, 360, 370, for example, to define the model components.

A metadata model may be further modified with new IaC solutions. To define a new type of metadata document for a desired model, an AML dialect, for example, can be used to map the structure of a newly-defined YAML/JSON document, for example, to the existing graph of information and overlay additional semantics for the nodes in the graph. With that information, an AML processor tool, for example, can parse and validate additional instances of the metadata document and generate the output graph of information with the defined semantics.

Metadata model instances can be flexibly created from the aggregate graph of information. This graph of information can be saved in compatible graph databases, such as JSON-LD, for example, or it can be queried using a standard graph query language. Open-source databases, such as JSON-LD, for example, can provide the semantics of the information, including detailed definitions that can be processed by machines and reused across multiple metadata documents even if the syntactical details of the information vary, for example.

Figure 4:
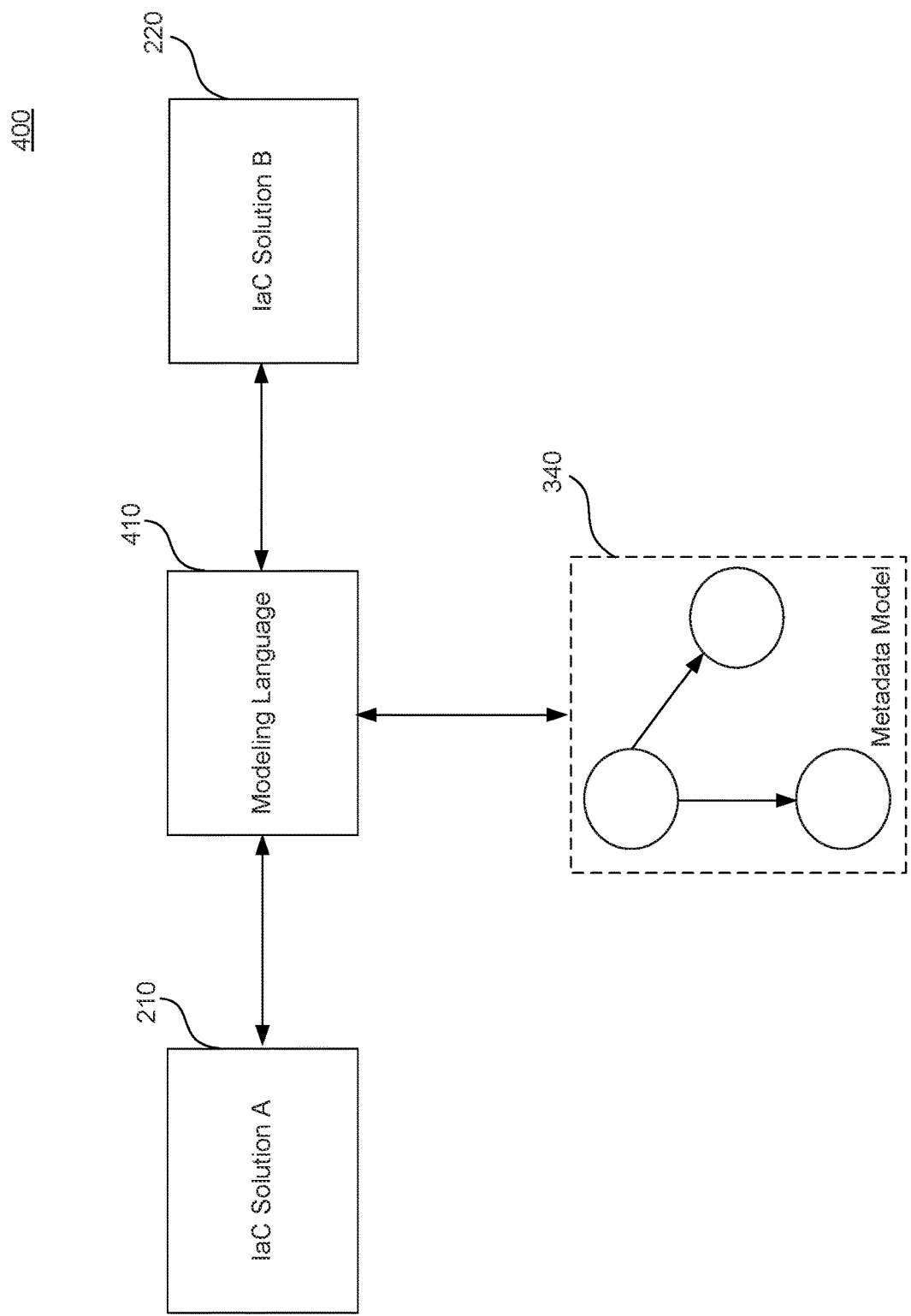
FIG. 4 illustrates a diagram showing multiple IaC solutions translated to and from a modeling language, which can use both solutions to produce a metadata model, according to some embodiments.

The main idea is to create a metadata model (for example, an AML dialect) to model an abstract infrastructure domain language, capable of being translated in, to, and from many other IaC solutions. For example, FIG. 4 illustrates a diagram 400 showing that IaC solution A 210 and IaC solution B 220 can be translated to and from modeling language 410, which can subsequently use both solutions to produce metadata model 340, according to some embodiments. Metadata model 340 can also be used to inform changes to modeling language 410.

Additionally, by way of example, AML dialect definitions can use AML vocabularies but also mix with external vocabularies (of different semantics). AML dialects describing metadata documents can work with vocabularies identified by a universal resource identifier (URI), for example. A graphical user interface (GUI) backend can then use this URI to generate a dialect that can interface to each vocabulary from separate and different infrastructures, for example. A person of ordinary skill in the art could identify any number of various vocabularies with which to interface. The standardization of the dialect interface can allow the infrastructure to be translated from one external IaC project to a new project, and the new project to be translated back to the original IaC project or to other IaC project, such that each IaC project may be used in a different third-party tool that uses a different developer language. The standardization can use the same vocabulary (i.e., semantics) to know what resource to map with what other resource.

Figure 5:
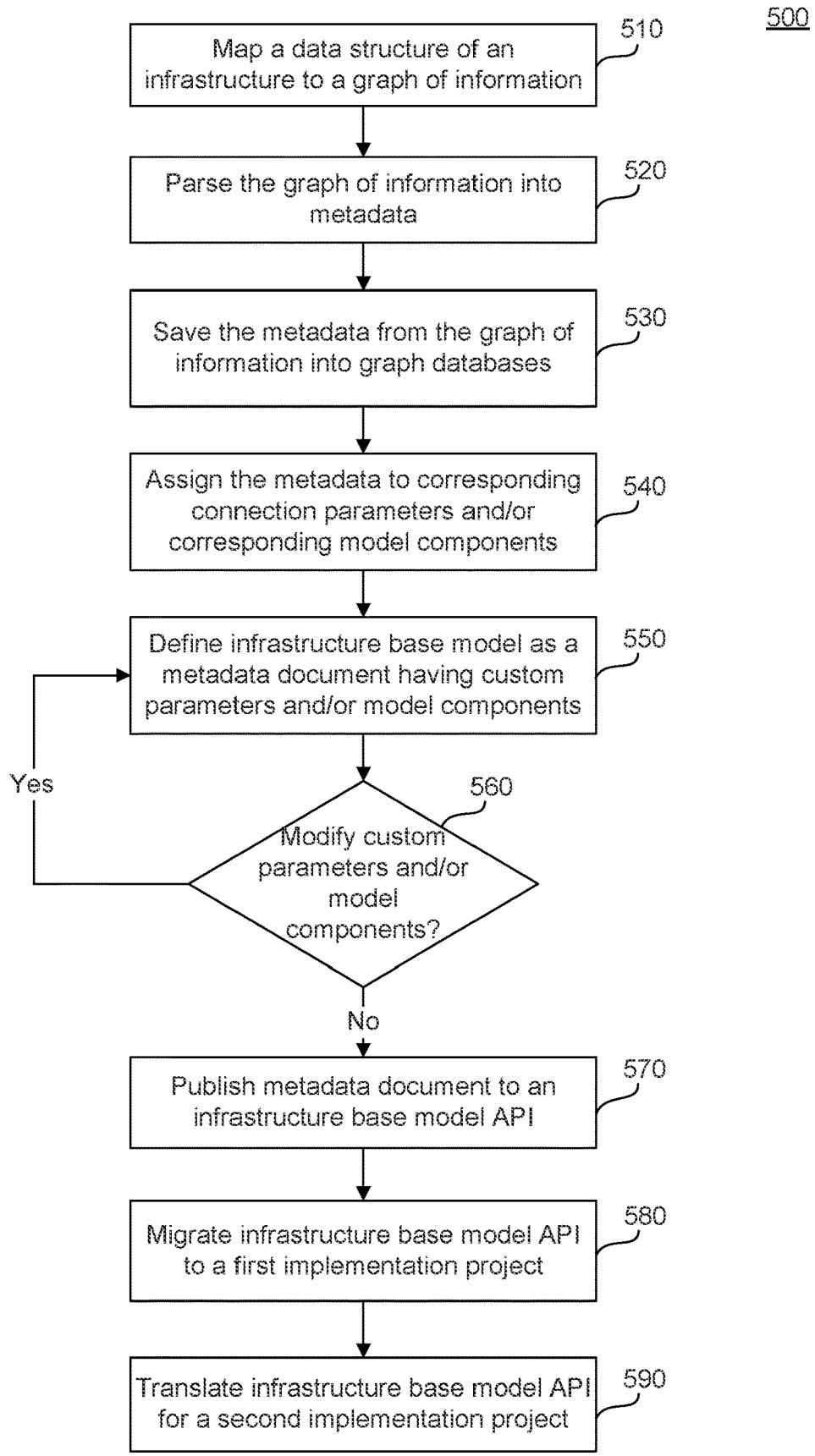
FIG. 5 summarizes a method for creating and managing an infrastructure base model API, according to some embodiments.

A method for creating and managing an infrastructure base model API is summarized in FIG. 5, which illustrates a flowchart 500 describing steps of the method, according to some embodiments. The steps of this example method shown need not be completed in the particular order shown. In step 510, a data structure, which can be represented by one or more IaC files, for example, of an infrastructure is mapped to a graph of information. In step 520, the graph of information, and therefore the data structure, is parsed into metadata including semantics of the data structure. In step 530, the graph of information is saved into graph databases. In step 540, specific semantics from the graph databases are overlaid onto nodes of the graph corresponding to instances of the metadata for building a metadata document. In other words, pieces of the metadata are assigned to corresponding connection parameters and/or corresponding model components. In step 550, an infrastructure base model API is built from the metadata document having these corresponding connection parameters and/or corresponding model components.

A user, for example, a developer, can query a graph database for specific semantics to create a custom metadata document for building an infrastructure base model API for a unique IaC solution that can be migrated to a specific implementation project. If a developer desires to make changes to an existing infrastructure base model API, for example, in step 560, the developer can modify connection parameters and/or model components in the graph database to create new semantics. The modification can include changing existing connection parameters and/or model components in the graph database, adding new connection parameters and/or model components to the graph database, removing connection parameters and/or model components from the graph database, and importing connection parameters and/or model components from an external IaC solution and/or infrastructure base model API into the graph database, for example.

In step 570, when the developer is satisfied with the chosen connection parameters and/or model components, the resulting infrastructure base model API having a metadata document with the chosen connection parameters and/or model components can be published to a custom infrastructure base model API. In step 580, the custom infrastructure base model API can be migrated to an implementation project, which can subsequently be used to provision and/or manage a CDC, for example. In step 590, the custom infrastructure base model API can be translated for another implementation project by changing, adding to, removing from, or importing into the connection parameters and/or model components as desired and building a new custom infrastructure base model API for migrating to that implementation project. A created or modified implementation project can also be imported into a third-party IaC (not shown), for example.

Graphical User Interface for Creating and Managing the Infrastructure Base Model API A web-based graphical user interface (GUI) can be used to implement embodiments of the method, assisting a developer or other user with automation of various steps, using a myriad of user-friendly features. The GUI can also further abstract the infrastructure assets into a graphical rendering to design, develop, build, and edit, for example, an infrastructure base model API easily using drag and drop actions. The GUI can provide guidance and ease of use of the API-based modeling functions, including selection, arrangement, grouping, and connection of assets, for example, for quick and easy infrastructure modeling without the need for coding. The infrastructure model in a graphical form can be used to configure machines automatically and perform validations, searches, and parameter changes using calls to metadata. The disclosed GUI can also import other infrastructure models, specifically by abstracting other API definitions, such as those of third parties, for example. These APIs can be modified and exported to another or the same implementation project using the GUI.

The GUI backend can use metadata graphs, invisible to a user, created from AML or other metadata documents, for example, to provide infrastructure assets defined by multiple types of metadata from the graphs. The GUI backend can use the metadata graphs as a basis for storing and querying available infrastructure assets, translated to the user as asset groupings and query functions. Infrastructure assets can be available in the GUI in a menu of categories and/or as graphically rendered icons that can be selected (i.e., grabbed) and dragged to connect with other icons through selectable connections. The infrastructure assets (components and connections) can be configured, reused, and reconfigured, for example, to create various infrastructure models.

For infrastructure assets that already exist, a user may select specific assets based on a provided definition in the GUI, where the provided definition may comprise the specific semantics of the assets, for example. The user may therefore use knowledge of the semantics to select assets for building an infrastructure. Alternatively, the assets may be grouped based on asset type or intended infrastructure type such that a user would not need to have as much knowledge of the semantics themselves. Alternatively, the GUI can provide templates of complex infrastructure patterns based on specific, varied, and many infrastructure requirements, as would be understood by a person of ordinary skill in the art. These templates can be reusable and modifiable by changing the requirements. The GUI can provide a summary report of the infrastructure requirements for each template to better inform and enable the user to later reuse, modify, or import a model infrastructure with desired requirements.

Figure 6:
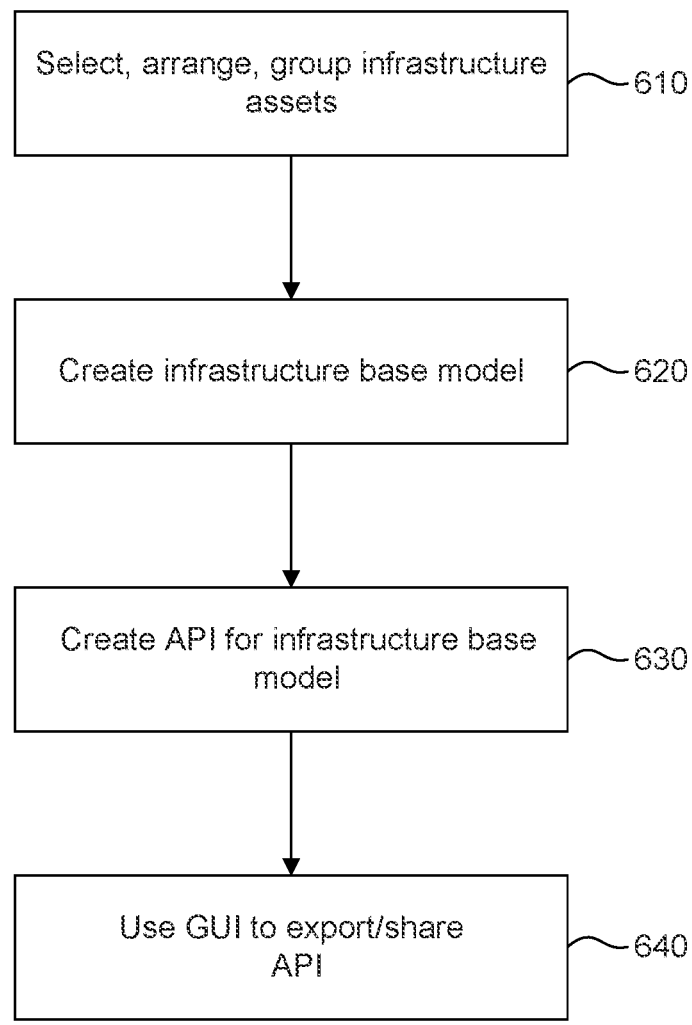
FIG. 6 summarizes a basic method for using a graphical user interface (GUI) to create, publish, and share an infrastructure base model API, according to some embodiments.

FIG. 6 illustrates a flow chart 600 summarizing a basic method for using a GUI to create, publish, and share an infrastructure base model API, according to some embodiments. In step 610, a user can select, arrange, and/or group, for example, infrastructure assets. A user can use the GUI to select infrastructure assets and make connections graphically, for example. Alternatively or additionally, a user can use the GUI in a more "expert" mode to define or modify particular parameters of assets for additional tailoring of a particular asset or the infrastructure. Regardless of the level of user interaction to select infrastructure assets, the GUI can provide a clear graphical view of the selection, arrangement, and grouping of the infrastructure components and connections.

In step 620, the GUI can then be used to create an infrastructure base model when the user has completed the selection, arrangement, and grouping of the desired graphical infrastructure components and connections. When the graphical infrastructure base model is complete, in step 630, the user can create an API for that infrastructure base model via an API generation GUI application. Finally, in step 640, this API can be exported and shared via the GUI to provide the infrastructure base model for defining an infrastructure project.

It is to be stressed again that, in this process, it is possible for the user to create an infrastructure using only graphical representations of its components and connections, where the components and connections may originate from various different sources (for example, APIs and IaC tools). The GUI can also provide the user the ability to modify certain parameters of the individual components and connections and/or parameters of the infrastructure as a whole, without requiring the user to understand the original syntax behind the source assets.

The GUI backend can use explicit schema with formal semantics from the metadata documents (for example, AML metadata documents) to automate parsing and validation of existing infrastructure models and further validation of their assets. Within the GUI, a validation application can indicate whether a model is invalid due to errors in the schema or semantics, which could potentially cause incompatibilities in the component and/or connection assets. The GUI can also provide hyperlinks, for example, from the metadata documents as a mechanism to validate the infrastructure target on a network to which the metadata documents would be published.

The GUI can provide the ability for a user to import a third-party or otherwise external API from a unique IaC project. The GUI can have an import menu option that can call the GUI backend and request the return of an infrastructure base model for that project. The GUI can also provide the ability for a user to export an API or one or more individual assets to other implementation projects.

To facilitate both importing and exporting of APIs and assets, the GUI backend can use vocabularies (with AML semantics, for example) and other external vocabularies (with different semantics) to build dialect definitions. The GUI backend can generate a dialect that can interface to each vocabulary from separate and different infrastructures. The standardization of the dialect interface allows the infrastructure to be translated from one external IaC project to a new project, without the user having to recode either project. Similarly, the new project can be translated back to the original IaC project or to other IaC project, again, without the user having to recode. The translated IaC project may be used in a different third-party tool that uses a different developer language. The standardization uses the same vocabulary (i.e., semantics) to know what resource to map with what other resource.

Computer System Implementation

Figure 7:
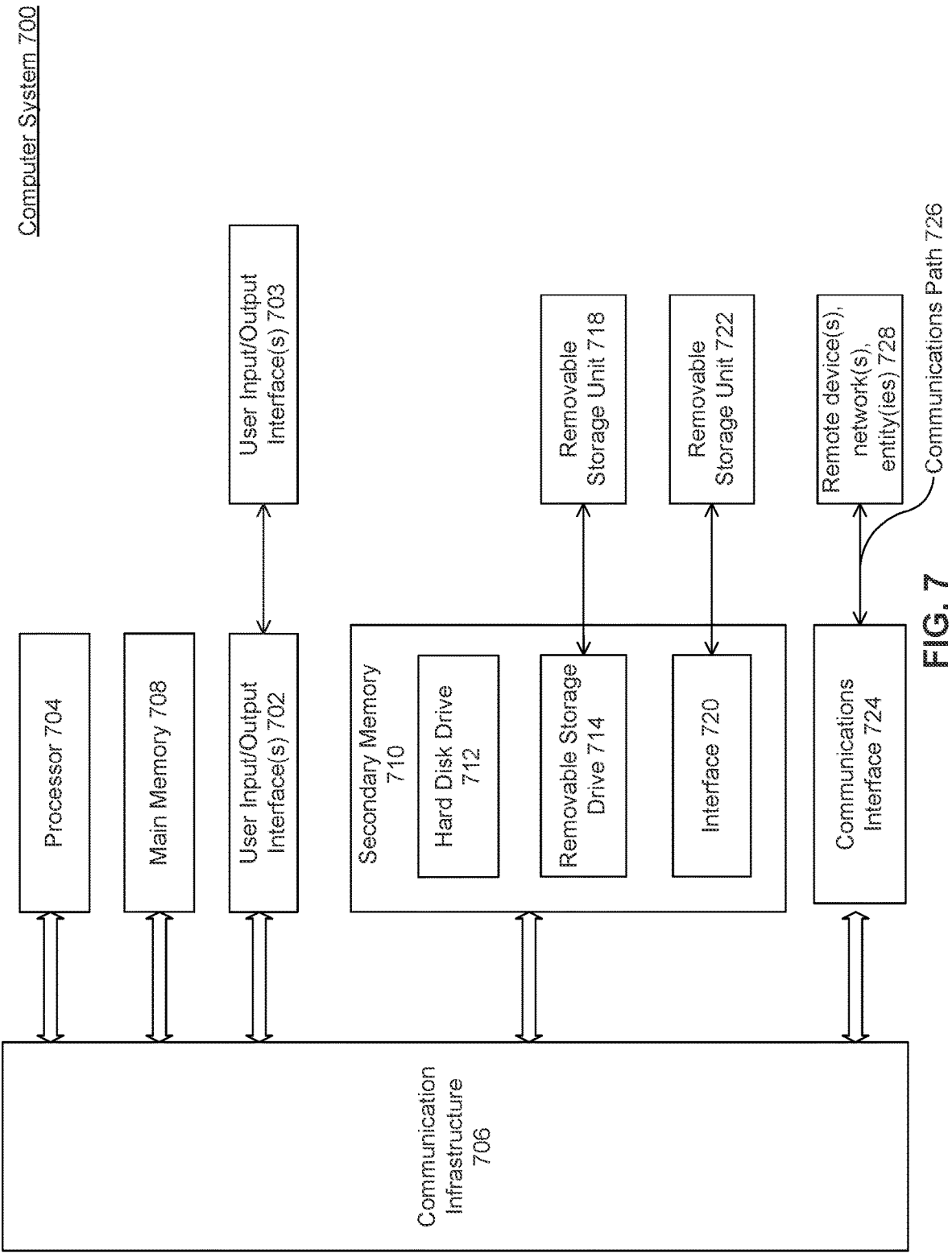
FIG. 7 illustrates an example computer system useful for implementing various embodiments.

Various embodiments may be implemented using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main (or primary) memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 or a removable storage device or drive 714. Removable storage drive 714 may be a floppy disk drive, a magnetic tape drive, a compact disk drive, an optical storage device, tape backup device, or any other storage device/drive.

Removable storage drive 714 may interact with a removable storage unit 718. Removable storage unit 718 may include a computer usable or readable storage device having stored thereon computer software (control logic) or data. Removable storage unit 718 may be a floppy disk, magnetic tape, compact disk, DVD, optical storage disk, or any other computer data storage device. Removable storage drive 714 may read from or write to removable storage unit 718.

Secondary memory 710 may include other means, devices, components, instrumentalities, or other approaches for allowing computer programs or other instructions or data to be accessed by computer system 700. Such means, devices, components, instrumentalities, or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 700 may further include a communications or network interface 724. Communications interface 724 may enable computer system 700 to communicate and interact with any combination of external devices, external networks, external entities, etc. (individually and collectively referenced by reference number 728). For example, communications interface 724 may allow computer system 700 to communicate with external or remote devices 728 over communications path 726, which may be wired or wireless (or a combination thereof), and which may include any combination of LANs, WANs, the Internet, etc. Control logic or data may be transmitted to and from computer system 700 via communications path 726.

Computer system 700 may also be any of a personal digital assistant (PDA), desktop workstation, laptop or notebook computer, netbook, tablet, smart phone, smart watch or other wearable, appliance, part of the Internet-of-Things, or embedded system, to name a few non-limiting examples, or any combination thereof.

Computer system 700 may be a client or server, accessing or hosting any applications or data through any delivery paradigm, including but not limited to remote or distributed cloud computing solutions; local or on-premises software ("on-premise" cloud-based solutions); "as a service" models (for example, content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems, or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, or entities illustrated in the figures or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an exemplary embodiment," or similar phrases, indicate that the embodiment described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected," along with their derivatives. These terms are not necessarily intended as synonyms for each other. For example, some embodiments can be described using the terms "connected" or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:

displaying, by one or more processors, a graphical user interface that allows a user to define an infrastructure base model that represents an infrastructure comprising components and connections between the components;

querying, by the one or more processors, a metadata graph to determine infrastructure assets available for selection in the graphical user interface, wherein the metadata graph provides an aggregate infrastructure definition of a first infrastructure-as-code solution and a second infrastructure-as-code solution, and wherein the aggregate infrastructure definition enables a migration of the infrastructure base model between a first implementation project that provisions the infrastructure using the first infrastructure-as-code solution and a second implementation project that provisions the infrastructure using the second infrastructure-as-code solution;

receiving, by the one or more processors, a selected available asset from the infrastructure assets available for selection and a command that connects the selected available asset with a selected component in the components; and creating, by the one or more processors, a selectable connection between the selected component and the selected available asset in the infrastructure base model, wherein parameters of the selectable connection are modifiable in the graphical user interface.

2. The method of claim 1, further comprising: translating, by the one or more processors, the first implementation project to the second infrastructure-as-code solution.

3. The method of claim 1, wherein the infrastructure assets available for selection are displayed in a menu of categories.

4. The method of claim 1, wherein the graphical user interface further provides an infrastructure template representing a complex infrastructure pattern for importing as the infrastructure base model.

5. The method of claim 4, wherein the graphical user interface further provides a summary report of infrastructure requirements for the infrastructure template.

6. The method of claim 1, wherein the connections between the components invoke system application programming interfaces.

7. The method of claim 1, further comprising:
providing a validation application in the graphical user interface that determines whether the infrastructure base model is invalid due to errors in a schema or semantics.

8. A system, comprising:
a memory; and
at least one processor coupled to the memory and configured to:
display a graphical user interface that allows a user to define an infrastructure base model that represents an infrastructure comprising components and connections between the components;
query a metadata graph to determine infrastructure assets available for selection in the graphical user interface, wherein the metadata graph provides an aggregate infrastructure definition of a first infrastructure-as-code solution and a second infrastructure-as-code solution, and wherein the aggregate infrastructure definition enables a migration of the infrastructure base model between a first implementation project that provisions the infrastructure using the first infrastructure-as-code solution and a second implementation project that provisions the infrastructure using the second infrastructure-as-code solution;
receive a selected available asset from the infrastructure assets available for selection and a command that connects the selected available asset with a selected component in the components; and
create a selectable connection between the selected component and the selected available asset in the infrastructure base model, wherein parameters of the selectable connection are modifiable in the graphical user interface.

9. The system of claim 8, the at least one processor further configured to:
translate the first implementation project to the second infrastructure-as-code solution.

10. The system of claim 8, wherein the infrastructure assets available for selection are displayed in a menu of categories.

11. The system of claim 8, wherein the graphical user interface further provides an infrastructure template representing a complex infrastructure pattern for importing as the infrastructure base model.

12. The system of claim 11, wherein the graphical user interface further provides a summary report of infrastructure requirements for the infrastructure template.

13. The system of claim 8, wherein the connections between the components invoke system application programming interfaces.

14. The system of claim 8, the at least one processor further configured to:
provide a validation application in the graphical user interface that determines whether the infrastructure base model is invalid due to errors in a schema or semantics.

15. A non-transitory computer-readable medium having instructions stored thereon that, when executed by at least one computing device, causes the at least one computing device to perform operations comprising:
displaying a graphical user interface that allows a user to define an infrastructure base model that represents an infrastructure comprising components and connections between the components;
querying a metadata graph to determine infrastructure assets available for selection in the graphical user interface, wherein the metadata graph provides an aggregate infrastructure definition of a first infrastructure-as-code solution and a second infrastructure-as-code solution, and wherein the aggregate infrastructure definition enables a migration of the infrastructure base model between a first implementation project that provisions the infrastructure using the first infrastructure-as-code solution and a second implementation project that provisions the infrastructure using the second infrastructure-as-code solution;
receiving a selected available asset from the infrastructure assets available for selection and a command that connects the selected available asset with a selected component in the components; and
creating a selectable connection between the selected component and the selected available asset in the infrastructure base model, wherein parameters of the selectable connection are modifiable in the graphical user interface.

16. The non-transitory computer-readable medium of claim 15, the operations further comprising:
translating the first implementation project to the second infrastructure-as-code solution.

17. The non-transitory computer-readable medium of claim 15, wherein the infrastructure assets available for selection are displayed in a menu of categories.

18. The non-transitory computer-readable medium of claim 15, wherein the graphical user interface further provides an infrastructure template representing a complex infrastructure pattern for importing as the infrastructure base model.

19. The non-transitory computer-readable medium of claim 18, wherein the graphical user interface further provides a summary report of infrastructure requirements for the infrastructure template.

20. The non-transitory computer-readable medium of claim 15, the operations further comprising:
provided a validation application in the graphical user interface that determines whether the infrastructure base model is invalid due to errors in a schema or semantics.

* * * * *